Patented Mar. 7, 1939

2,149,734

UNITED STATES PATENT OFFICE 2,149,734

LAUNDRY STARCH AND METHOD OF USING THE SAME

Ralph E. Hall, Mount Lebanon, Pa., assignor to Hall Laboratories, Inc., Pittsburgh, Pa., a corporation of Pennsylvania No Drawing. Application June 17, 1937, Serial No. 148,725

6 Claims. (Cl. 134—19)

This invention relates to laundry starch and methods of using the same. The present invention is an improvement upon the invention disclosed in my Patent 2,009,692, granted July 30, 1935.

According to my said patent, laundry starches are improved by mixing therewith an alkali-metal hexametaphosphate. The starch to which the alkali-metal hexametaphosphate has been added gives a smoother glossier finish of more uniform quality and appearance over the fabric which has been ironed than does starch not containing the metaphosphate.

In accordance with the present invention I have found that I may employ an alkali-metal tripolyphosphate in place of the alkali-metal metaphosphate for improving the starch. The alkali-metal tripolyphosphates have certain distinct advantages as compared to the alkali-metal metaphosphates when employed in starches, as will be pointed out more fully hereinafter. The alkali-metal tripolyphosphates are chemical compounds of the formula $M_5P_3O_{10}$ in their anhydrous form. Sodium tripolyphosphate is the most common and important of the alkali-metal tripolyphosphates. Chemical and X-ray analyses show that sodium tripolyphosphate is a definite chemical compound which is distinct from both sodium metaphosphate and sodium pyrophosphate and that it is not a mixture of the two. Sodium tripolyphosphate is fusible and may be solidified by very rapid cooling in a glassy amorphous form. Under slower cooling it solidifies in the form of crystals. The glass may be converted into crystal form by annealing. Sodium tripolyphosphate forms a crystalline hydrate of the general formula $Na_5P_3O_{10}.6H_2O$. Sodium tripolyphosphate is colorless, appearing white in the granulated crystalline form. When crushed it forms a free-flowing granular mass. By suitable precautions it may be produced in a mass which readily disintegrates into its constituent fine crystals. Sodium tripolyphosphate is not deliquescent and particularly in its hydrated form may be preserved indefinitely in ordinary atmospheres without caking or picking up moisture. Sodium tripolyphosphate is readily water-soluble in both its glassy and crystalline forms. In moderately dilute solutions, say of about 0.5%, it produces a mildly alkaline solution of a pH value of approximately 9.8, which is definitely and remarkably stable and does not decompose on standing.

Sodium tripolyphosphate may be prepared in the following manner. Suitable quantities of sodium carbonate and phosphoric acid to yield a molar ratio of 5 to 3 between $Na_2O$ and $P_2O_5$ may be heated in a suitable furnace until the water formed by the reaction of the sodium carbonate and phosphoric acid, together with any water of crystallization, is driven off. The mixture at temperatures somewhat in excess of 750° C. is pasty and may be poured from the furnace into molds or onto a casting wheel. The fluidity of the mixture is increased by increasing the temperature and at 860° C. it will be entirely fluid and contain no solid component. At temperatures in excess of 610° C. and below those of complete fluidity, the solid phase is crystalline anhydrous sodium pyrophosphate. As the temperature decreases toward 610° C., the amount of the solid phase of sodium pyrophosphate crystals increases until the mass becomes quite thick and mushy.

If the mixture is heated above 860° C., which is above the temperature at which solid sodium pyrophosphate can exist, the mixture is completely fluid, and upon very rapid chilling it becomes a supercooled liquid which may be considered as sodium tripolyphosphate in non-crystalline glassy form. In order to obtain the tripolyphosphate in such glassy form, the fluid mass must be cast in thin layers against cold surfaces so that it is supercooled in liquid form before there is an opportunity for the formation of pyrophosphate crystals. Upon annealing, the glassy tripolyphosphate may be converted into crystalline form.

It is preferred, however, to form the crystalline tripolyphosphate by slow cooling of the fluid or pasty mixture. If the reaction mixture is heated to a temperature between 610° C. and 860° C. a more or less pasty mass, depending upon the temperature, is formed containing crystals of sodium pyrophosphate in a molten mass. If the mass is heated above 860° C. and slowly cooled, the same type of mass is formed, namely, sodium pyrophosphate crystals in the molten matrix. The proportion of sodium pyrophosphate crystals increases as the temperature decreases toward 610° C. As the temperature is decreased below about 610° C., which is the peritectic or incongruent melting point of the sodium tripolyphosphate, the sodium pyrophosphate crystals disappear and crystals of sodium tripolyphosphate appear. If the mass is allowed to cool rapidly to appreciably below 610° C., the pyrophosphate crystals will be trapped and the resultant solid will contain pyrophosphate crystals in amount depending upon the rapidity of the cooling. Corresponding to the amount of pyrophosphate left in the mixture, there will be an equivalent amount of metaphosphate which will usually be in the form of the hexametaphosphate. On the other hand, if the mass is cooled slowly from about 610° C., the pyrophosphate crystals will entirely disappear and the mass will solidify as sodium tripolyphosphate in anhydrous crystalline form.

The mass may, for example, be cooled slowly from 610° C. to 550° C. in about one-half an hour's time, which will result in the formation of a solid consisting of tripolyphosphate crystals, or the mass may be held at about 600° C. for about one-half hour, in which case sodium pyrophosphate crystals will disappear and the mass will go completely solid as sodium tripolyphosphate crystals. After the complete conversion of the mass to sodium tripolyphosphate crystals, the cooling thereafter may be rapid.

The mass of tripolyphosphate crystals thus prepared is readily disintegrable into a fine crystalline powder.

Instead of phosphoric acid and sodium carbonate, there may be used as starting ingredients phosphoric pentoxide and sodium hydroxide, or a mixture of monosodium orthophosphate and disodium orthophosphate, or a mixture of sodium metaphosphate and sodium pyrophosphate, or other suitable soda base and source of $P_2O_5$. In each case, the proportions of the mixture are so chosen that the molar ratio between $Na_2O$ and $P_2O_5$ is as 5 to 3 if a pure sodium tripolyphosphate is to be obtained.

Sodium tripolyphosphate may also be prepared by heating to reaction temperatures below 540° C. a mixture of hydrated monosodium orthophosphate and hydrated disodium orthophosphate. This mixture when heated melts in its water of crystallization and if maintained at a temperature of about 500° C. will lose substantially all of its water, becoming a white crystalline mass, which upon cooling likewise readily disintegrates into a fine white powder consisting of crystalline sodium tripolyphosphate. In this reaction the sodium tripolyphosphate appears to be formed directly without the production of pyrophosphate crystals, and therefore precautions do not have to be taken to cool the mass slowly.

A suitable laundry starch solution according to the present invention may be made by adding approximately 1.5 quarts of a 25 per cent. solution of sodium tripolyphosphate to each 25 gallons of prepared starch solution. The starch may be applied by dipping the fabric into it or by starching machines. Instead of adding a solution of the sodium tripolyphosphate to a starch solution, a solid mixture of the starch and the sodium tripolyphosphate may be made and this mixture dissolved in water to form the improved starch solution. Sodium tripolyphosphate has a number of advantages over sodium metaphosphate when used in conjunction with laundry starch. Starch solutions are used in a heated condition since the starch penetrates into the fabric better when heated than when cold. Sodium hexametaphosphate has a tendency to revert to orthophosphate when subjected to prolonged heating. Sodium tripolyphosphate, on the other hand, is considerably more stable in heated solutions than the metaphosphate. Also in the ironing of the fabric the tendency of the metaphosphate to revert to the orthophosphate is considerably greater than that of the tripolyphosphate.

Sodium tripolyphosphate is considerably more stable than sodium hexametaphosphate in alkaline solutions. Alkali starches, that is, starches made by using caustic soda or other alkalis in the preparation of the starch, always contain some alkali remaining after washing the starch. When used with such starches the sodium tripolyphosphate is much more stable than the sodium metaphosphate, particularly when the starch solutions are heated. In some starches alkaline materials are added for various purposes, and likewise in these starches the tripolyphosphate is much more stable than the metaphosphate.

A further advantage of the sodium tripolyphosphate as compared with sodium hexametaphosphate is that the tripolyphosphate is not hygroscopic, as is sodium hexametaphosphate. Also, it can be readily prepared in crystalline form without the drastic chilling which is required in producing glassy sodium hexametaphosphate. Sodium tripolyphosphate can therefore be readily prepared as a free-flowing material which will not become moist on standing in ordinary atmospheres, as does the metaphosphate. This property renders the tripolyphosphate particularly advantageous as compared with the metaphosphate since the tripolyphosphate may be mixed with the starch to form a solid mixture which does not cake.

While I prefer to use sodium tripolyphosphate, the water-soluble tripolyphosphates of the other alkali metals such as those of potassium, ammonium and lithium may be employed.

I have described a preferred starch solution, but it is to be understood that the proportions of starch and alkali-metal tripolyphosphates may be varied and that the invention may be otherwise embodied or practiced within the scope of the following claims.

I claim:

1. Laundry starch containing an alkali-metal tripolyphosphate.
2. Laundry starch containing sodium tripolyphosphate.
3. A starch solution containing an alkali-metal tripolyphosphate.
4. A starch solution containing sodium tripolyphosphate.
5. The method of starching textile material, which comprises treating it with a starch solution containing alkali-metal tripolyphosphate.
6. The method of starching textile material which comprises treating it with a starch solution containing sodium tripolyphosphate.

RALPH E. HALL.